United States Patent
Saka et al.

(10) Patent No.: US 10,237,959 B2
(45) Date of Patent: Mar. 19, 2019

(54) DISCHARGE LAMP LIGHTING DEVICE

(71) Applicant: USHIO DENKI KABUSHIKI KAISHA, Tokyo (JP)

(72) Inventors: Kosuke Saka, Himeji (JP); Minoru Fukuda, Himeji (JP); Shigeyoshi Matsumoto, Himeji (JP); Shoichi Terada, Himeji (JP)

(73) Assignee: USHIO DENKI KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/161,491

(22) Filed: Oct. 16, 2018

(65) Prior Publication Data

US 2019/0053361 A1 Feb. 14, 2019

Related U.S. Application Data

(63) Continuation of application No. 15/501,614, filed as application No. PCT/JP2015/072154 on Aug. 5, 2015, now abandoned.

(30) Foreign Application Priority Data

Aug. 28, 2014 (JP) ................................ 2014-173906

(51) Int. Cl.
*H05B 41/288* (2006.01)
*H05B 41/36* (2006.01)
(Continued)

(52) U.S. Cl.
CPC .............. *H05B 41/36* (2013.01); *H01J 61/00* (2013.01); *H05B 41/2886* (2013.01);
(Continued)

(58) Field of Classification Search
CPC ............ H05B 33/0845; H05B 33/0815; H05B 33/0809; H05B 37/0227; H05B 33/0803; H05B 37/0272; H05B 37/0281
(Continued)

(56) References Cited

U.S. PATENT DOCUMENTS

2009/0091269 A1\* 4/2009 Perin .................. H05B 41/2885
  315/250
2010/0148686 A1 6/2010 Arimoto et al.
(Continued)

FOREIGN PATENT DOCUMENTS

JP 2006-156414 A 6/2006
JP 2013-033605 A 2/2013
(Continued)

OTHER PUBLICATIONS

International Search Report issued in PCT/JP2015/072154; dated Oct. 27, 2015.
(Continued)

*Primary Examiner* — Wei (Victor) Chan
(74) *Attorney, Agent, or Firm* — Studebaker & Brackett PC

(57) ABSTRACT

A discharge lamp lighting device includes a control unit adapted to control a frequency of the AC electric current supplied to a discharge lamp by a feeding unit, in different manners within a first term and a second term which are alternately repeated, the control unit is adapted to control the frequency of the AC electric current such that, within the first term, the frequency of the AC electric current becomes at least one frequency out of plural set frequencies, and is further adapted to control the frequency of the AC electric current, based on a predetermined frequency and an electric current within the previous first term, such that, within the second term, the frequency of the AC electric current
(Continued)

becomes a frequency lower than this predetermined frequency.

14 Claims, 13 Drawing Sheets

(51) Int. Cl.
  *H01J 61/12* (2006.01)
  *H01J 61/04* (2006.01)
  *H01J 61/00* (2006.01)
(52) U.S. Cl.
  CPC .......... *H05B 41/2887* (2013.01); *H01J 61/04* (2013.01); *H01J 61/12* (2013.01); *Y02B 20/202* (2013.01)
(58) Field of Classification Search
  USPC .......................... 315/360, 307, 291, 289, 224
  See application file for complete search history.

(56) References Cited

U.S. PATENT DOCUMENTS

| 2010/0253236 A1 | 10/2010 | Yamada |
| 2012/0313546 A1 | 12/2012 | Imamura et al. |
| 2014/0167641 A1 | 6/2014 | Imamura et al. |
| 2015/0201481 A1 | 7/2015 | Fukuda et al. |

FOREIGN PATENT DOCUMENTS

| JP | 2014-032760 A | 2/2014 |
| JP | 2014-149965 A | 8/2014 |

OTHER PUBLICATIONS

A "Decision to Grant a Patent" issued by the Japanese Patent Office dated Apr. 4, 2016, in connection with Japanese Patent Application No. 2014-173906.
International Preliminary Report on Patentability issued in PCT/JP2015/072154; dated Feb. 28, 2017.

* cited by examiner

| Voltage (V) | Electric current (A) | Multiplying factor |
|---|---|---|
| 50 ≦ V < 65 | 3.85 ≦ A < 5.00 | 1 |
| 65 ≦ V < 75 | 3.33 ≦ A < 3.85 | 1/2 |
| 75 ≦ V < 100 | 2.50 ≦ A < 3.33 | 1/3 |
| 100 ≦ V < 120 | 2.08 ≦ A < 2.50 | 1/4 |
| 120 ≦ V < 150 | 1.66 ≦ A < 2.08 | 1/5 |
| 150 ≦ V < 170 | 1.47 ≦ A < 1.66 | 1/8 |

| Voltage (V) | Electric current (A) | Multiplying factor |
|---|---|---|
| 50≦V< 60 | 4.17≦A<5.00 | 1/4 |
| 60≦V< 85 | 2.94≦A<4.17 | 1/8 |
| 85≦V<110 | 2.27≦A<2.94 | 1/12 |
| 110≦V<130 | 1.92≦A<2.27 | 1/16 |
| 130≦V<150 | 1.66≦A<1.92 | 1/20 |
| 150≦V<170 | 1.47≦A<1.66 | 1/32 |

DISCHARGE LAMP LIGHTING DEVICE

CROSS REFERENCE TO RELATED APPLICATIONS

This application is a Continuation of U.S. patent application Ser. No. 15/501,614, filed Feb. 3, 2017, which is the U.S. National Stage Entry of PCT/JP2015/072154, filed Aug. 5, 2015, which claims the benefit of Japanese Patent Application No. 2014-173906 filed on Aug. 28, 2014; the entire contents of which are incorporated herein by reference.

TECHNICAL FIELD

The present invention relates to a discharge lamp lighting device for supplying an AC electric current to discharge lamps having a pair of electrodes placed to oppose each other within a discharge container enclosing a predetermined gas.

BACKGROUND ART

Conventionally, as discharge lamps, there have been known discharge lamps that include a discharge container enclosing a halogen gas and a pair of electrodes placed to oppose each other within the discharge container. Further, as a discharge lamp lighting device for lighting such discharge lamps, there have been known a discharge lamp lighting device for supplying an AC electric current to discharge lamps (refer to Patent Document 1, for example).

When such a discharge lamp is lighted, the electrodes reach a higher temperature and are evaporated. Then, the evaporated metal bonds to the halogen gas enclosed within the discharge container and, thus, returns to the electrodes again without being adhered to the inner surface of the discharge container. This effect is referred to as a halogen cycle.

On the other hand, the discharge lamp lighting device according to Patent Document 1 is adapted to supply, to a discharge lamp, an AC electric current having two different frequencies independent of data about operations of the discharge lamp (voltage value, electric current value, luminance, distance between the electrodes, temperature and the like). By doing this, a shape of the electrodes can be preferably maintained at the beginning of lighting, but it has been difficult to maintain the shape of the electrodes (particularly, their protruding portions) as the lighting time period is increased. This has made the life of the discharge lamp shorter.

PRIOR ART DOCUMENTS

Patent Documents

Patent Document 1: JP-A-2006-156414

SUMMARY OF THE INVENTION

Technical Problems

Therefore, in view of the aforementioned circumstance, it is an object of the present invention to provide a discharge lamp lighting device capable of elongating a life of a discharge lamp.

Solution to the Problems

According to the present invention, there is provided a discharge lamp lighting device, which includes:

a feeding unit adapted to supply an AC electric current to a discharge lamp having a pair of electrodes placed to oppose each other within a discharge container which encloses a predetermined gas; and a control unit adapted to control a frequency of the AC electric current supplied to the discharge lamp by the feeding unit, in different manners within a first term and a second term which are alternately repeated;

wherein the control unit is adapted to control the frequency of the AC electric current such that, within the first term, the frequency of the AC electric current becomes at least one frequency out of plural set frequencies, and is further adapted to control the frequency of the AC electric current, based on a predetermined frequency and an electric current within the previous first term, such that, within the second term, the frequency of the AC electric current becomes a frequency lower than this predetermined frequency.

According to the discharge lamp lighting device of the present invention, the feeding unit supplies the AC electric current to the discharge lamp having the pair of electrodes placed to oppose each other within the discharge container which encloses predetermined gasses. The control unit controls the frequency of the AC electric current supplied to the discharge lamp from the feeding unit, in the different manners, within the first terms and the second terms which are alternately repeated.

At first, within the first terms, the control unit controls the frequency of the AC electric current such that the frequency of the AC electric current becomes one frequency out of the plural set fixed frequencies. On the other hand, the positions on the electrodes to which the metal evaporated from the electrodes returns depend on the temperature of the electrodes. Further, the temperature of the electrodes depends on the frequencies within the first terms and the electric current within the first terms.

Therefore, within each of the second terms, the control unit controls the frequency of the AC electric current, based on the electric current and the predetermined frequency within the previous first term, such that the frequency of the AC electric current becomes the frequency which is lower than the predetermined frequency. Consequently, the positions on the electrodes to which the evaporated metal returns within the previous first terms are accurately figured out. Accordingly, within the second terms, it is possible to supply the AC electric current with a frequency suitable thereto, to the discharge lamp. Therefore, even when the discharge lamp is lighted for a longer time period, it is possible to maintain the shape of the electrodes (particularly, the protruding portions). This can elongate the time period for which the shape of the electrodes can be maintained.

Also, the discharge lamp lighting device according to the present invention may have a configuration in which:

the control unit is adapted to control the frequency of the AC electric current such that the frequency of the AC electric current becomes a predetermined frequency out of plural set frequencies, within the first term.

Also, the discharge lamp lighting device according to the present invention may have a configuration in which:

the control unit is adapted to control the frequency of the AC electric current such that, within the first term, the frequency of the AC electric current becomes at least two frequencies out of the plural set frequencies, and is further adapted to control the frequency of the AC electric current, based on an electric current and a frequency having a largest time ratio within the previous first term, such that, within the second term, the frequency of the AC electric current becomes a frequency lower than this frequency.

Also, the discharge lamp lighting device according to the present invention may have a configuration in which:

the control unit is adapted to control the frequency of the AC electric current such that, within the first term, the frequency of the AC electric current becomes at least two frequencies out of the plural set frequencies, and is further adapted to control the frequency of the AC electric current, based on an electric current and a lowest frequency within the previous first term, such that, within the second term, the frequency of the AC electric current becomes a frequency lower than this frequency.

Also, the discharge lamp lighting device according to the present invention may have a configuration in which:

the plural frequencies to be set within the first term are set to be respective frequencies provided by multiplying a highest frequency out of the plural frequencies by the inverses of respective natural numbers, and the frequency within the second term is set to be a frequency provided by multiplying the highest frequency by the inverse of a natural number.

Also, the discharge lamp lighting device according to the present invention may have a configuration in which:

the control unit is adapted to control the frequency of the AC electric current in such a way as to alternately repeat a basic term and a lower-frequency term, the basic term being provided for controlling the frequency of the AC electric current in different manners within the first term and the second term which are alternately repeated, and the lower-frequency term being provided for controlling the frequency of the AC electric current such that the frequency of the AC electric current becomes a frequency lower than a lowest frequency within the previous basic term.

Also, the discharge lamp lighting device according to the present invention may have a configuration in which:

the control unit is adapted to control the frequency of the AC electric current, based on an electric current and a predetermined frequency within the previous basic term, such that the frequency of the AC electric current becomes a frequency lower than the predetermined frequency, within the lower-frequency term.

Also, the discharge lamp lighting device according to the present invention may have a configuration in which:

the plural frequencies to be set within the first term are set to be frequencies provided by multiplying a highest frequency out of the plural frequencies by the inverses of respective natural numbers, the frequency within the second term is set to be a frequency provided by multiplying the highest frequency by the inverse of a natural number, and the frequency within the lower-frequency term is set to be a frequency provided by multiplying the highest frequency by the inverse of a natural number.

Effect of the Invention

As described above, the discharge lamp lighting device according to the present invention provides the excellent effect of elongating the life of the discharge lamp.

DESCRIPTION OF EMBODIMENTS

Figure 1:
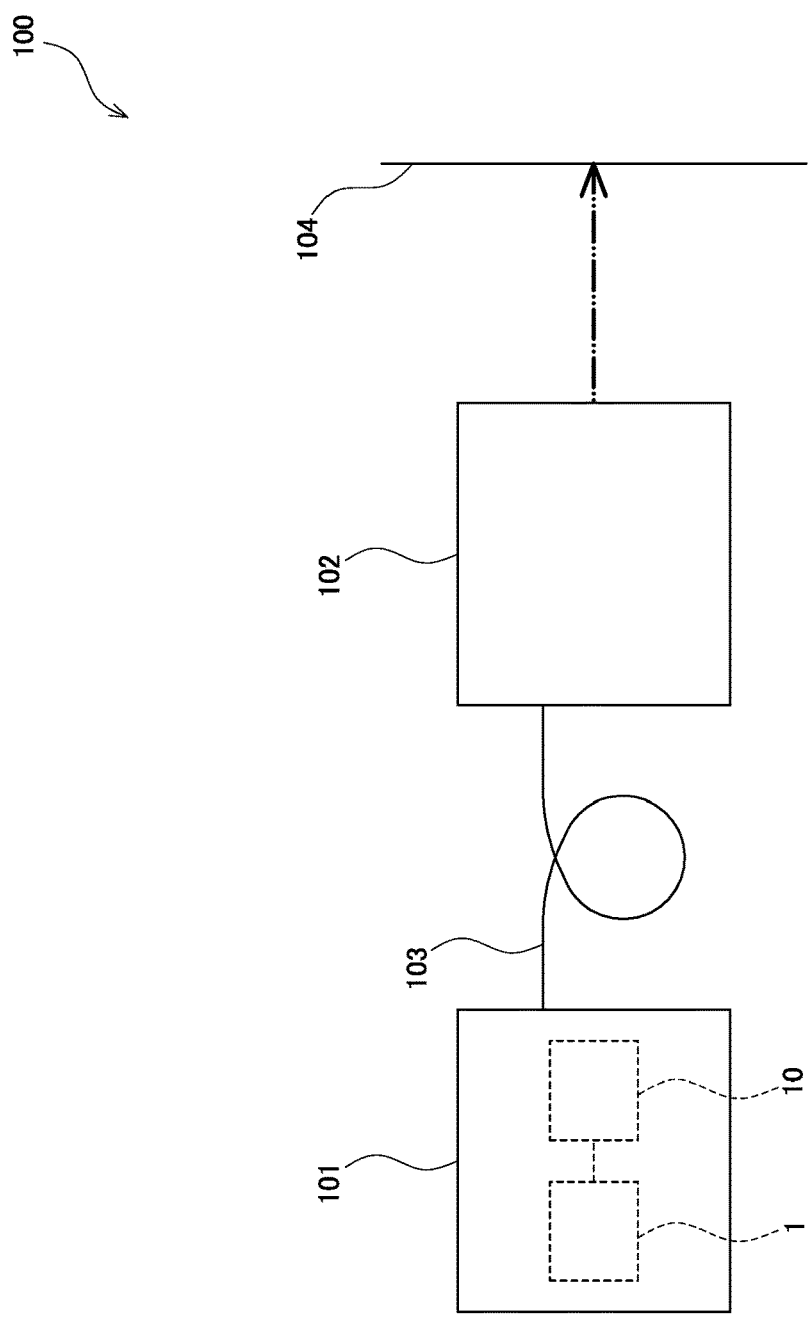
FIG. 1 is a schematic view of an image projection device having a discharge lamp lighting device according to an embodiment of the present invention.

Hereinafter, an embodiment of a discharge lamp lighting device according to the present invention will be described with reference to FIGS. 1 to 9. Note that, throughout the drawings, the dimensional ratios in the drawings are not necessarily coincident with the actual dimensional ratios. Further, the discharge lamp lighting device according to the present embodiment is used in an image projection device (for example, a projector).

As illustrated in FIG. 1, an image projection device 100 includes a light source device 101 for emitting light, and a projection-device main body 102 which creates light images with the light emitted from the light source device 101 and projects them onto a screen 104. Further, the image projection device 100 includes an optical fiber 103 connected at its respective end portions to the light source device 101 and to the projection-device main body 102, in order to enter the light emitted from the light source device 101 to the projection-device main body 102.

The light source device 101 includes a discharge lamp 10 for emitting light, and a discharge lamp lighting device 1 for supplying an AC electric current to the discharge lamp 10. Note that, although not illustrated, the light source device 101 includes an optical system such as a convergence lens or a collimator lens.

Although not illustrated, the projection-device main body 102 includes an image optical system for creating light images by receiving the light emitted from the light source device 101, and a projection optical system (for example, a projection lens) for receiving the light images emitted from the image optical system and for projecting them onto the screen 104. Further, the image optical system includes an optical system, such as a spatial modulation element, for modulating light into light images.

Figure 2:
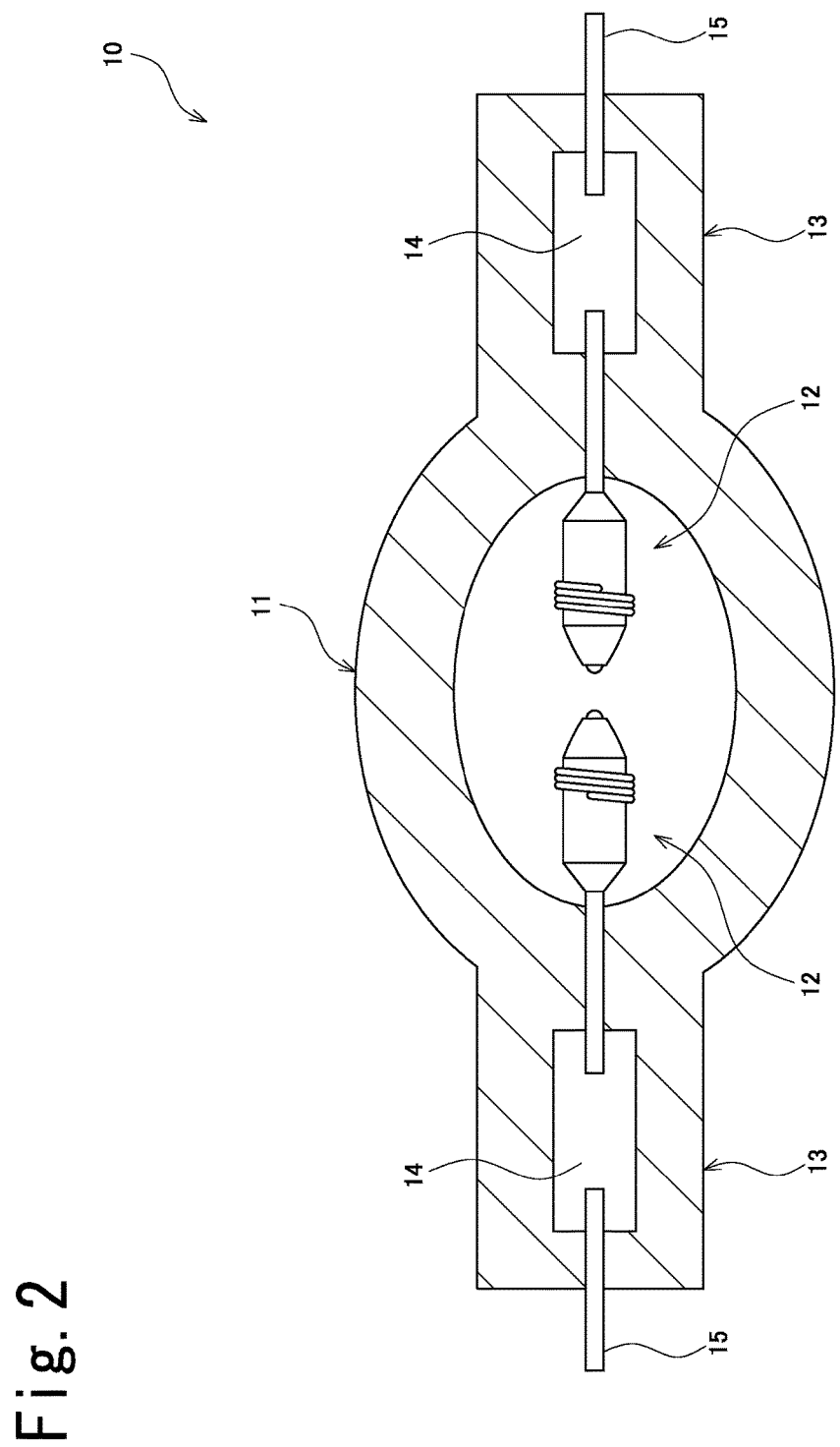
FIG. 2 is a schematic cross-sectional view of a discharge lamp which is supplied with an AC electric current from the discharge lamp lighting device according to the same embodiment.
Figure 3:
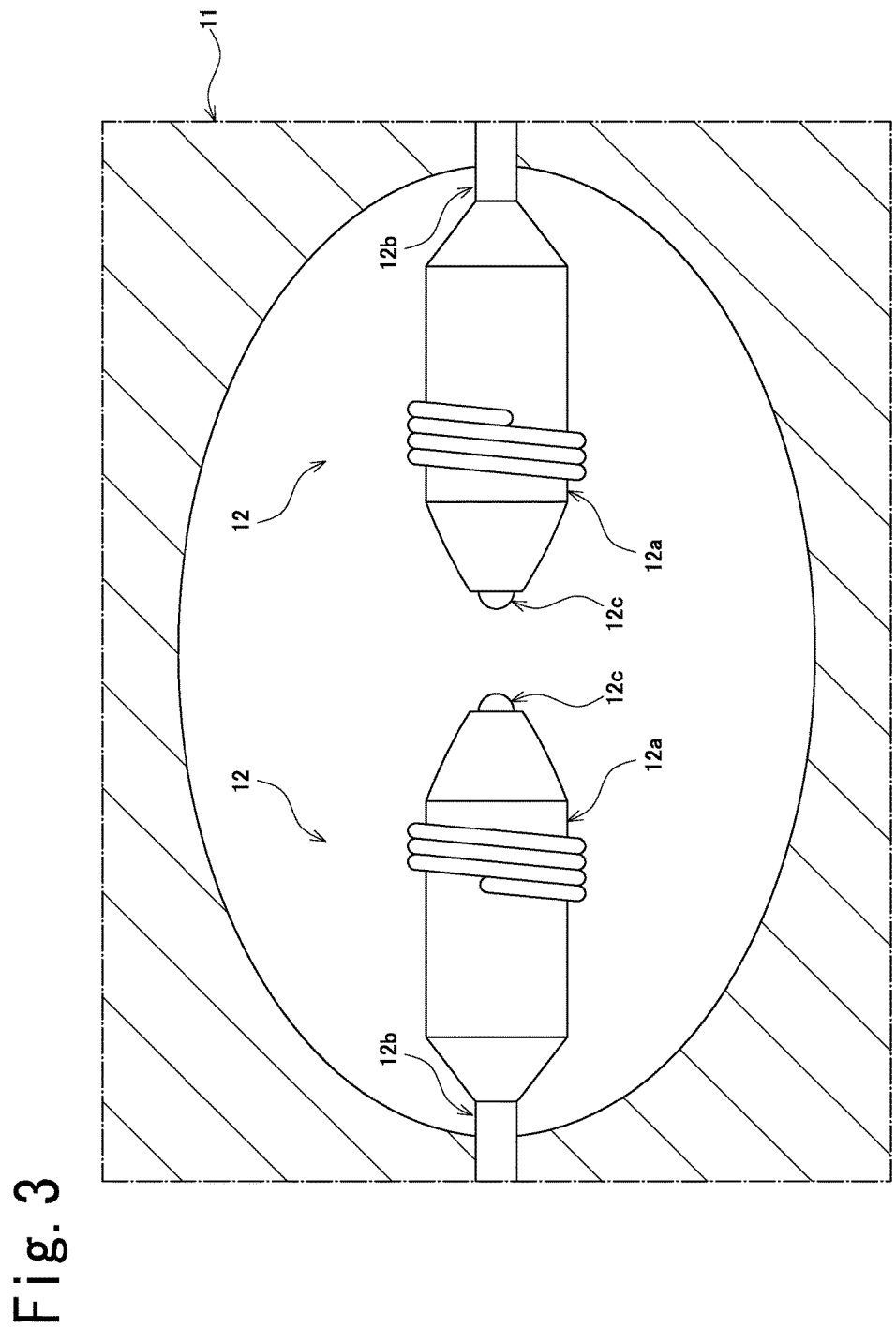
FIG. 3 is an enlarged view of main parts of the discharge lamp, in FIG. 2, according to the same embodiment.

As illustrated in FIGS. 2 and 3, the discharge lamp 10 includes a hollow-shaped discharge container 11, and a pair of electrodes 12, 12 which are placed to oppose each other within the discharge container 11. The discharge lamp 10 includes sealing portions 13, 13 placed at the opposite end portions of the discharge container 11, metal foils 14 embedded in the sealing portions 13, and outer leads 15 connected to the metal foils 14.

The discharge container 11 is formed to have a spherical shape. The discharge container 11 is translucent and radiates light generated therein toward the outside. In the present embodiment, the discharge container 11 is formed integrally with the sealing portions 13 and is formed from quartz glass. The material of the discharge container 11 and the sealing portions 13 is not limited to quartz glass, and they may be formed from a different material.

The electrodes 12 include a head portion 12a housed in the discharge container 11, and a shaft portion 12b which is formed to have a smaller diameter than that of the head portion 12a and is secured to the discharge container 11. The electrodes 12 include a protruding portion 12c at the tip end of the head portion 12a. The protruding portion 12c is formed from the electrode material which has been aggregated at the tip end of the electrode 12 during lighting of the discharge lamp 10, as will be described later.

The pair of electrodes 12 (the head portions 12a, 12a) are placed to oppose each other in such a way as to interpose, therebetween, an extremely small interval which is equal to or less than 2 mm, for example. In the present embodiment, the electrodes 12 are formed from tungsten. The material of the electrodes 12 is not limited to tungsten, and they may be formed from a different material.

The metal foils 14 are formed from a conductive material made of, for example, molybdenum and are embedded in an airtight manner within the sealing potions 13 using shrink sealing, for example. The metal foils 14 are bonded, at their one end portions, to the other end portions of the shaft portions 12b of the electrodes 12. The other end portions of the metal foils 14 are bonded to one end portions of the outer leads 15.

In the discharge lamp 10, a light-emitting gas, a halogen gas and an inert gas are enclosed within the discharge container 11. The light-emitting gas is for providing radiated light and is constituted by mercury in the present embodiment. The halogen gas is for increasing the life of the discharge lamp 10 which utilizes a halogen cycle and is constituted by iodine in the present embodiment. The inert gas is for improving lighting startability and is constituted by argon in the present embodiment. The respective gases enclosed therein are not limited to the aforementioned gases and may be constituted by other gases.

The mercury is for providing radiated light with a necessary visible light wavelength, such as a wavelength in the range of 360 to 780 nm, for example. The mercury is enclosed in an amount of 0.20 mg/mm3 within the discharge container 11, for example. This amount of mercury enclosed therein, which may be varied depending on temperature conditions, is for achieving a higher vapor pressure, as an internal pressure in the discharge container 11 during lighting, which is equal to or higher than 200 atm. Further, by enclosing a larger amount of mercury therein, it is possible to fabricate the discharge lamp 10 which contains a higher mercury vapor pressure, that is, the mercury vapor pressure during lighting is equal to or higher than 250 atm or equal to or higher than 300 atm. Thus, it is possible to realize a light source more suitable for a projector as the mercury vapor pressure is higher.

The halogen gas is enclosed within the discharge container 11, in the state of being combined with mercury or other metals. The halogen gas is enclosed within the discharge container 11, in an amount selected from the range of $1×10{-6}$ μmol/mm$^3$ to $1×10{-2}$ μmol/mm$^3$. The largest reason for the enclosure of halogen therein is to elongate the life of the discharge lamp 10 which utilizes the halogen cycle. Further, in cases where the discharge lamp 10 has an extremely smaller size and a higher lighting vapor pressure, it is also possible to provide an effect of preventing devitrification of the discharge container 11.

When the electrodes 12, 12 are energized, the electrodes 12 are incandesced to reach a higher temperature, so that the tungsten forming the electrodes 12 is sublimated. The sublimated tungsten bonds to the halogen gas enclosed therein to form a tungsten halide, in the inner wall surface area of the discharge container 11 which is a portion at a relatively lower temperature. The tungsten halide has a relatively higher vapor pressure and, therefore, moves again to the vicinities of the tip ends of the electrodes 12, in a gaseous state.

Further, by being heated again at the vicinities, the tungsten halide is separated into halogen and tungsten. Out of them, the tungsten returns to the tip ends of the electrodes 12 and is aggregated thereat, while the halogen is restored as a halogen gas within the discharge container 11. This phenomenon is called a halogen cycle. Further, the aggregated tungsten adheres to the vicinities of the tip ends of the electrodes 12 to form the protruding portions 12c.

As an example of the discharge lamp 10, it is possible to exemplify a discharge lamp 10 with a rated electric power (AC) of 250 W, wherein the discharge container 11 has a largest outer diameter of 9.4 mm, the distance between the electrodes 12, 12 is 1.0 mm, and the discharge container 11 has an internal volume of 55 mm$^3$.

Figure 4:
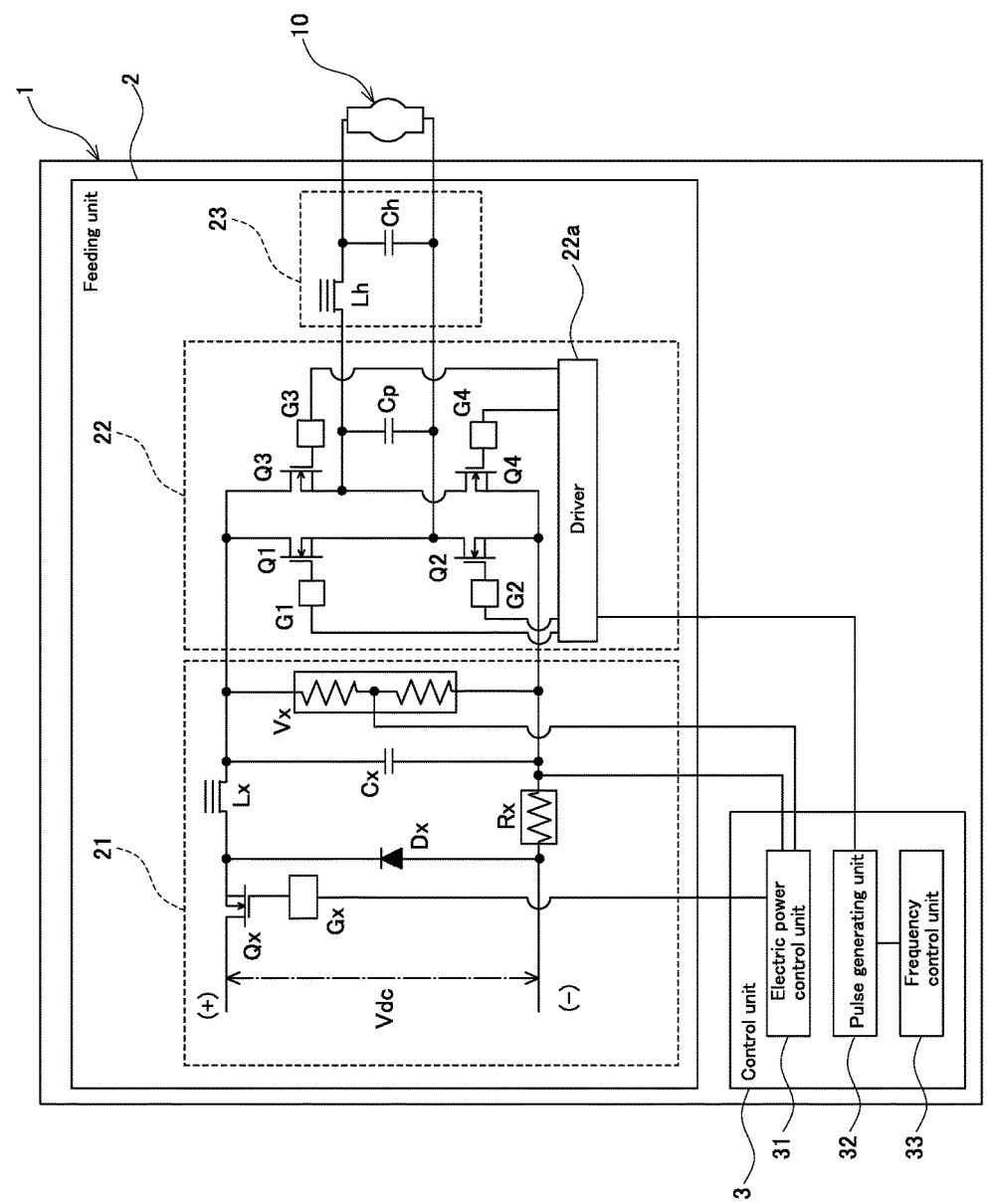
FIG. 4 is a block diagram of the discharge lamp lighting device according to the same embodiment.

As illustrated in FIG. 4, the discharge lamp lighting device 1 according to the present embodiment includes a feeding unit 2 for supplying an AC electric current to the discharge lamp 10 through the outer leads 15, in order to light the discharge lamp 10. Further, the discharge lamp lighting device 1 includes a control unit 3 for controlling the AC electric current supplied to the discharge lamp 10 from the feeding unit 2.

The feeding unit 2 includes a step-down chopper unit 21 for reducing a supplied DC voltage to a desired DC voltage, and a DC/AC conversion unit 22 for converting the DC voltage resulted from the voltage reduction by the step-down chopper unit 21 into an AC voltage with a desired frequency. The feeding unit 2 includes a starter unit 23 for raising the AC voltage supplied from the DC/AC conversion unit 22 and for supplying the raised voltage to the discharge lamp 10, at the time of starting (lighting) the discharge lamp 10.

The control unit 3 includes an electric-power control unit 31 for controlling the step-down chopper unit 21 to control the value of the electric power supplied to the discharge lamp 10 such that the value of the electric power is constant. The control unit 3 includes a pulse generating unit 32 for outputting pulse signals to the DC/AC conversion unit 22, and a frequency control unit 33 for controlling the frequency of the AC electric current supplied to the discharge lamp 10. The frequency control unit 33 controls the frequency of pulses generated by the pulse generating unit 32.

The circuit structure in the discharge lamp lighting device 1 according to the present embodiment will be described in detail. Note that the circuit structure in the discharge lamp lighting device 1 according to the present invention is not limited to this structure and may be a different circuit structure.

The step-down chopper unit 21 includes a switching element Qx, a reactor Lx, a diode Dx, a smoothing capacitor Cx, and a resistance Rx.

The switching element Qx is connected, at its one end, to a positive-side power-supply terminal, which is supplied with a DC voltage Vdc. The other end of the switching element Qx is connected to one end of the reactor Lx. The diode Dx is connected, at its cathode terminal, to the point of connection between the switching element Qx and the reactor Lx, and is connected to a negative-side power-supply terminal at its anode terminal. The smoothing capacitor Cx is connected, at its one end, to an output-side terminal of the reactor Lx. The other end of the smoothing capacitor Cx (its negative-side terminal) is connected to an output-side terminal of the resistance Rx. The resistance Rx is connected between the negative-side terminal of the smoothing capacitor Cx and the anode terminal of the diode Dx, and realizes an electric current detecting function.

The switching element Qx is driven by a gate signal Gx which is outputted from the electric power control unit 31. Depending on the duty of the gate signal Gx, the step-down chopper unit 21 reduces the input DC voltage Vdc to a voltage corresponding to this duty and outputs the reduced voltage to the DC/AC conversion unit 22 in the subsequent stage.

The DC/AC conversion unit 22 includes switching elements Q1 to Q4 which are connected to each other in a bridge shape (a full-bridge circuit).

The switching element Q1 is driven by a gate signal G1 which is outputted from a driver 22a. Similarly, the switching element Q2 is driven by a gate signal G2, the switching element Q3 is driven by a gate signal G3, and the switching element Q4 is driven by a gate signal G4. The driver 22a outputs the gate signals to the combination of the switching elements Q1 and Q4 and the combination of the switching elements Q2 and Q3 which are placed diagonally, in such away as to alternately turn them on and off. Thus, an AC voltage with a rectangular wave shape is generated, between the point of connection between the switching elements Q1 and Q2 and the point of connection between the switching elements Q3 and Q4.

The starter unit 23 includes a coil Lh and a capacitor Ch. At the time of starting the discharge lamp 10, the DC/AC conversion unit 22 applies, thereto, an AC voltage having a switching frequency (for example, several hundreds kHz) which is close to the resonance frequency of the LC serial circuit including the coil Lh and the capacitor Ch, thereby creating a high voltage necessary for starting the discharge lamp 10 in the secondary side of the starter unit 23. Thus, the high voltage is supplied to the discharge lamp 10. Further, after the discharge lamp 10 has been lighted, the frequency of the AC voltage supplied from the DC/AC conversion unit 22 is shifted to a normal frequency (for example, 1 Hz to 1000 Hz), thereby performing normal lighting.

Further, in the aforementioned circuit, the frequency of the AC voltage supplied to the starter unit 23 can be successfully changed by adjusting a cycle of switching between turning on and off the combination of the switching elements Q1 and Q4 and the combination of the switching elements Q2 and Q3 in the DC/AC conversion unit 22. Further, the peak value of the AC voltage supplied to the starter unit 23 can be successfully changed by adjusting the operation duty of the switching element Qx in the step-down chopper unit 21.

Namely, the switching element Qx in the step-down chopper unit 21 is turned on and off at a switching frequency corresponding to the duty of the gate signal Gx which is outputted from the electric power control unit 31, thereby changing the electric power supplied to the discharge lamp 10. For example, when the electric power supplied to the discharge lamp 10 is increased, the electric power control unit 31 performs control for decreasing the duty of the gate signal Gx in such a way as to attain a desired electric power value.

The structure of the discharge lamp lighting device 1 according to the present embodiment is as described above. Next, with reference to FIGS. 5 to 9, the discharge lamp lighting device 1 according to the present embodiment will be described, regarding control thereof and effects provided thereby.

Figure 5:
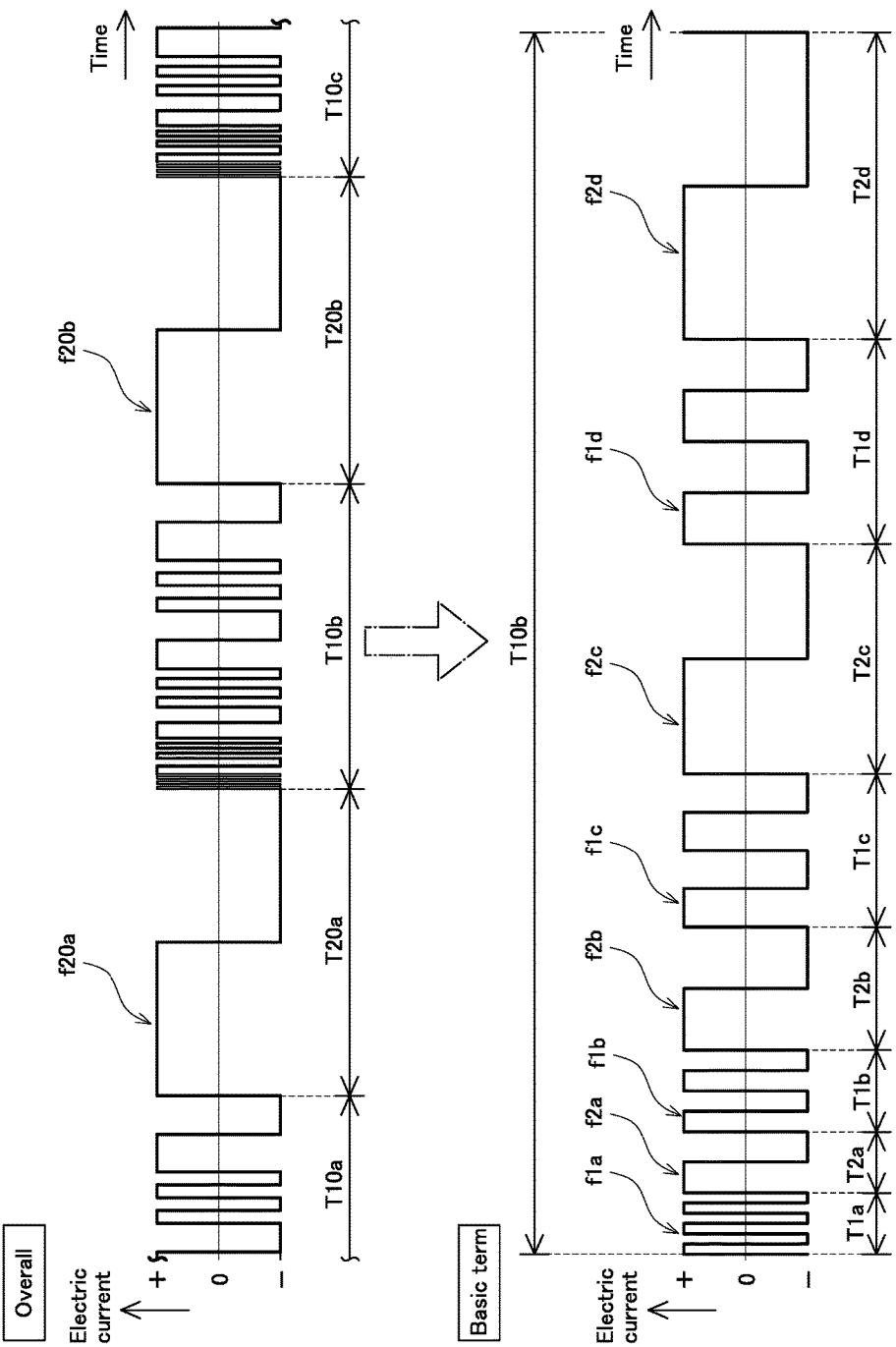
FIG. 5 is a view illustrating electric current waveforms in the discharge lamp lighting device according to the same embodiment.

As illustrated in FIG. 5, the control unit 3 controls the frequency of the AC electric current supplied to the discharge lamp 10 from the feeding unit 2, in predetermined control manners. Overall, the control unit 3 performs control in different manners, within basic terms T10 (T10a, T10b, T10c, . . . ) and lower-frequency terms T20 (T20a, T20b, . . . ) which are alternately repeated. Further, within the basic terms T10 (in FIG. 5, T10b is illustrated), the control unit 3 performs control in different manners, within fixation terms (also referred to as "first terms" in the present invention) T1 (T1a, T1b, T1c, T1d, . . . ) and variation terms (also referred to as "second terms" in the present invention) T2 (T2a, T2b, T2c, T2d, . . . ) which are alternately repeated.

At first, with reference to FIGS. 5 to 8, the control within the basic terms T10 including fixation terms T1 and variation terms T2, which are alternately repeated, will be described.

Within the fixation terms (the first terms), the control unit 3 controls the frequency of the AC electric current such that the frequency of the AC electric current becomes a predetermined single frequency out of plural set fixed frequencies f1. Namely, within the fixation terms T1, the control unit 3 controls the frequency of the AC electric current, in such a way as to select a predetermined single frequency out of the plural set fixed frequencies f1. Accordingly, within the respective fixation terms T1a to T1d, the fixed frequencies f1 are set to be respective ones of the fixed frequencies f1a to f1d.

In the present embodiment, four frequencies are set as the plural fixed frequencies f1. More specifically, the first to fourth fixed frequencies f1a to f1d are set to be 960 Hz, 480 Hz, 240 Hz and 120 Hz, respectively. Note that the fixed frequency f1 is varied for each fixation terms T1, based on data independent of data about operations of the discharge lamp 10 (the voltage value, the current value, the luminance, the distance between the electrodes, the temperature and the like), such as data which has been preliminarily obtained from experiments and the like.

Further, in the present embodiment, the fixed frequencies f1 (f1a to f1d) within the fixation terms T1 (T1a to T1d) are continuously varied, such that they are made gradually smaller. More specifically, when the fixed frequency f1 within a certain fixation term T1 (T1a) is the first fixed frequency f1a, the fixed frequency f1 within the next fixation term T1 (T1b) is the second fixed frequency f1b. Here, a certain fixed frequency f1 can be successively continued through two or more fixation terms T1. For example, when the fixed frequency f1 within a certain fixation term T1 (T1a) is the first fixed frequency f1a, the fixed frequency f1 within the next fixation term T1 (T1b) may be, again, the first fixed frequency f1a.

Figure 6:
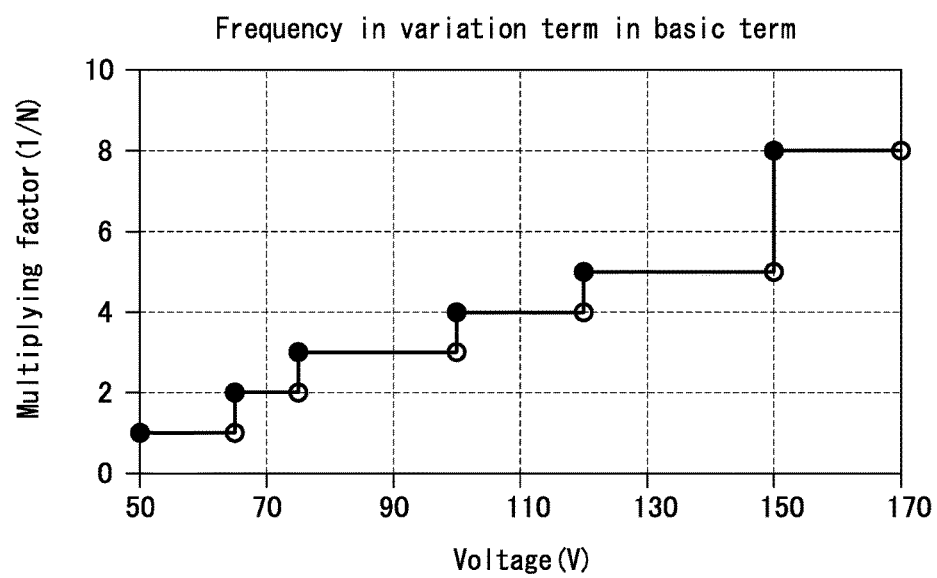
FIG. 6 is a view illustrating the relationship between a voltage (an electric current) and a multiplying factor for the frequency within variation terms, in the discharge lamp lighting device according to the same embodiment.

Further, within each of the variation terms (the second terms) T2, the control unit 3 controls the frequency of the AC electric current, based on the electric current and the fixed frequency f1 within the previous fixation term T1, such that the frequency of the AC electric current becomes a varied frequency f2 which is smaller than this fixed frequency f1. More specifically, as illustrated in FIG. 6, the control unit 3 sets the varied frequency f2 within each variation term T2 to be the result of calculation on the fixed frequency f1 within the previous fixation term T1 with a multiplying factor based on the electric current within the previous fixation term T1.

Note that, as the electric current within the previous fixation term T1, it is possible to employ, for example, an average electric current, an initial electric current within the fixation term T1, and a last electric current within the fixation term T1, and the like. Further, in the present embodiment, instead of the electric current within the previous fixation term T1, it is also possible to employ the voltage within the previous fixation term T1, which correlates with this electric current. This is because the discharge lamp 10 is controlled with constant electric power. In FIG. 5, the voltage within each of the fixation terms T1a to T1d is set to be 85 V, and each of varied frequencies f2a to f2d is set to be a frequency which is ⅓ time the fixed frequency f1a, f1b, f1c or f1d within the previous fixation terms T1a to T1d, as illustrated in FIG. 6.

On the other hand, the areas in the electrodes 12 from which the metal is evaporated and the positions on the electrodes 12 to which the evaporated metal is returned depend on the temperature of the electrodes 12. For example, the temperature of the electrodes 12 which permits the metal to evaporate therefrom is about 3000 K, and the temperature of the positions on the electrodes 12 to which the evaporated metal is returned is about 2500 K. Further, the temperature of the electrodes 12 depends on the electric current and the frequency of the AC electric current supplied to the discharge lamp 10.

Figure 7:
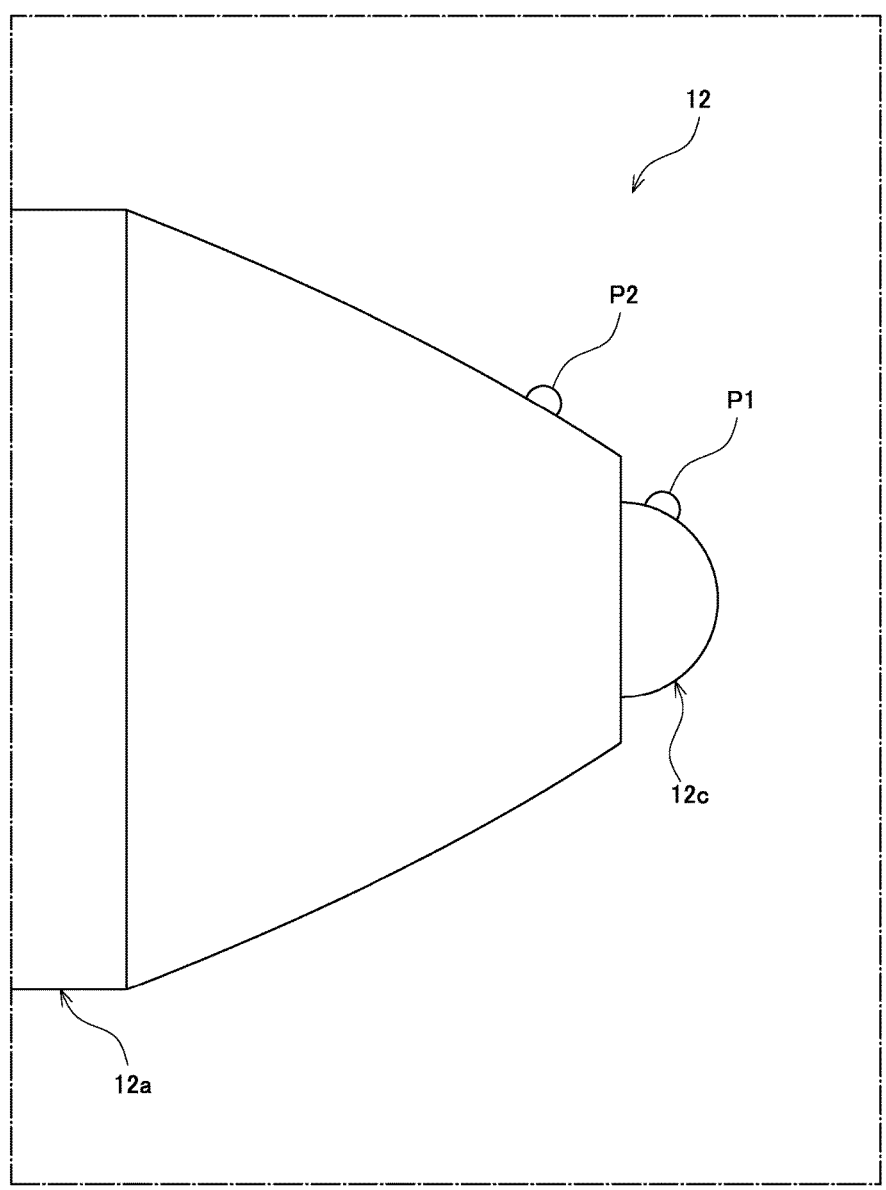
FIG. 7 is an enlarged view of main parts of the discharge lamp, which is a view for illustrating an effect of the discharge lamp lighting device according to the same embodiment.

Within the fixation terms T1, the electric current is hardly changed during these fixation terms T1. Therefore, as the frequency decreases, the positions on the electrodes 12 which reach a predetermined temperature (for example, 2500 K) get closer to the base ends. For example, as illustrated in FIG. 7, in the case of the first fixed frequency (960 Hz) which is a higher frequency, the position on the electrode 12 to which the metal returns are P1. In the case of the fourth fixed frequency (120 Hz) which is a lower frequency, the positions on the electrodes 12 to which the metal returns are P2, which are apart from the protruding portion 12c.

Further, within the variation terms T2, similarly, in cases where the electric current is constant, as the frequency decreases, the areas in the electrodes 12 which reach a predetermined temperature (for example, 3000 K) are spread to get closer to the base ends. More specifically, in the case of the first varied frequency (320 Hz) f2a which is a higher frequency, the positions on the electrodes 12 from which the metal can evaporate are limited to P1. In the case of the fourth varied frequency (40 Hz) f2d which is a lower frequency, the positions on the electrodes 12 from which the metal can evaporated are P1 and P2 and, namely, are spread up to the positions of P2.

Accordingly, within the fixation terms T1, the fixed frequency f1 is varied for each fixation term T1, based on data independent of data about operations of the discharge lamp 10. Consequently, the metal evaporated from the electrodes 12 is allowed return to desired positions on the electrodes 12. Further, within each of the variation terms (the second terms) T2, since the varied frequency f2 is set to correspond to the electric current and the fixed frequency f1 within the previous fixation term T1, evaporating, again, the metal returned during the previous fixation term T1 is allowed. Thus, the shape of the electrodes 12 can be maintained.

Figure 8:
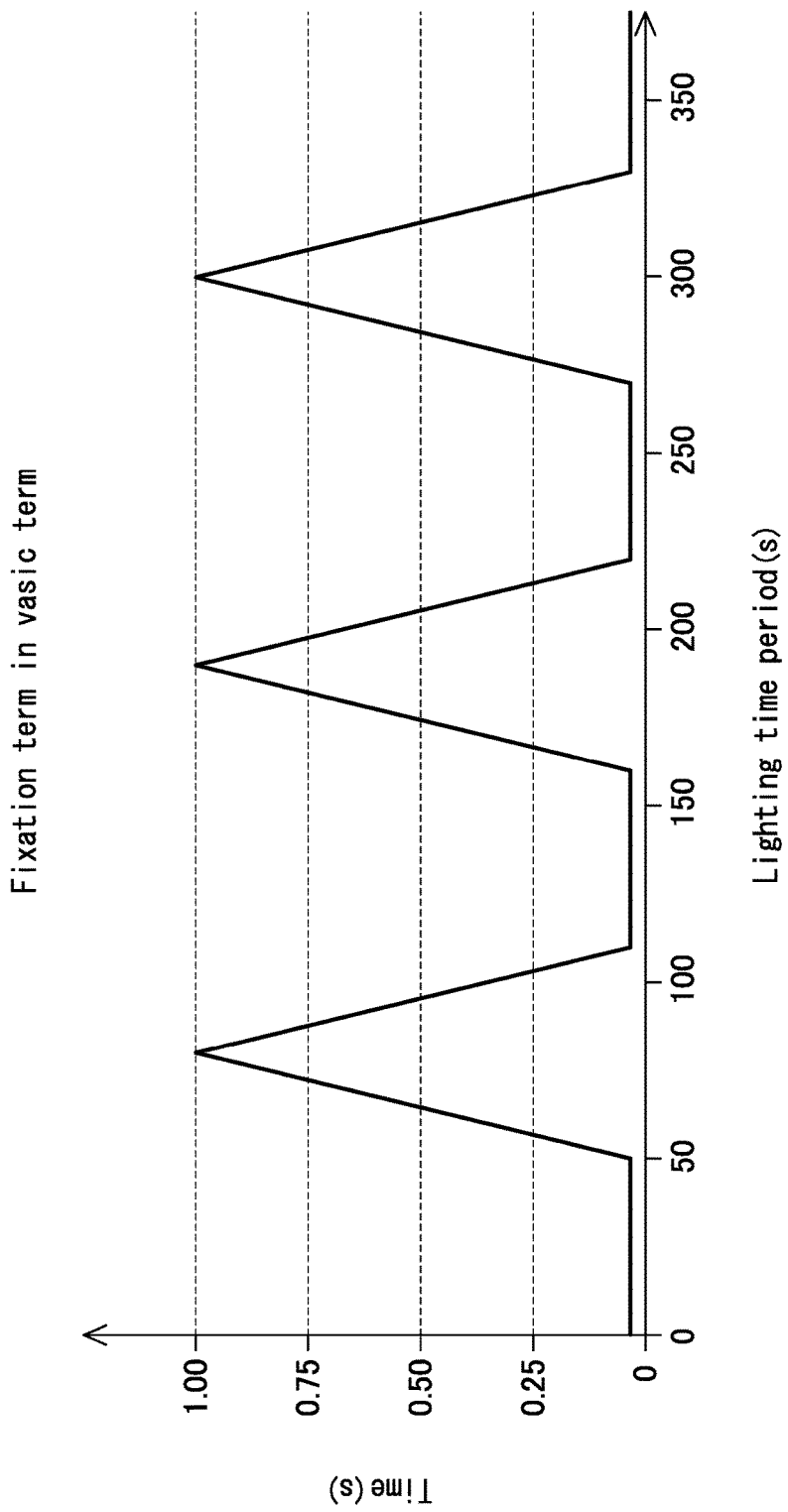
FIG. 8 is a view illustrating the relationship between the time period for which the discharge lamp is lighted and the time period of fixation terms, according to the same embodiment.

Further, as illustrated in FIG. 8, the time periods of the fixation terms T1 are varied. More specifically, the time periods of the fixation terms T1 are varied with the time period for which the discharge lamp 10 is lighted. In the present embodiment, along with the time period for which the discharge lamp 10 is lighted, a term within which the time periods of the fixation terms T1 are shorter, a term within which the time periods of the fixation terms T1 are gradually made longer, and a term within which the time periods of the fixation terms T1 are gradually returned to be shorter are repeated.

Since the time periods of the fixation terms T1 are varied, as described above, the frequency of evaporation of the metal from the electrodes 12 is varied. More specifically, the terms within which the time periods of the fixation terms T1 are shorter make the frequency of the variation terms T2 larger and, therefore, mainly function as terms for evaporating the metal from the electrodes 12. On the other hand, the terms within which the time periods of the fixation terms T1 are varied (made longer) make the frequency of the variation terms T2 smaller and, therefore, mainly function as terms for returning the metal to the electrodes 12. Consequently, the terms within which the metal evaporates from the electrodes 12 and the terms within which the metal returns to the electrodes 12 are distinctive, which enables effectively performing the halogen cycle.

On the other hand, if the time periods of the fixation terms T1 are abruptly varied (made longer), the metal simultaneously returns to the electrodes 12, thereby making it impossible to sufficiently evaporate the metal from the electrodes 12. On the contrary, in the present embodiment, the time periods of the fixation terms T1 are gradually varied (made longer), which causes the metal to gradually return to the electrodes 12, while gradually evaporating the metal from the electrodes 12. Consequently, the halogen cycle is more effectively performed.

The time periods of the fixation terms T1 may be set to be constant. Further, the time periods of the variation terms T2 are preferably set such that the variation frequencies f2 provide at least one period. Further, the time periods of the variation terms T2 can be set such that the variation frequencies f2 provide a constant period. Also, the time periods of the variation terms T2 can be set to be either a constant time period or varying time periods.

Figure 9:
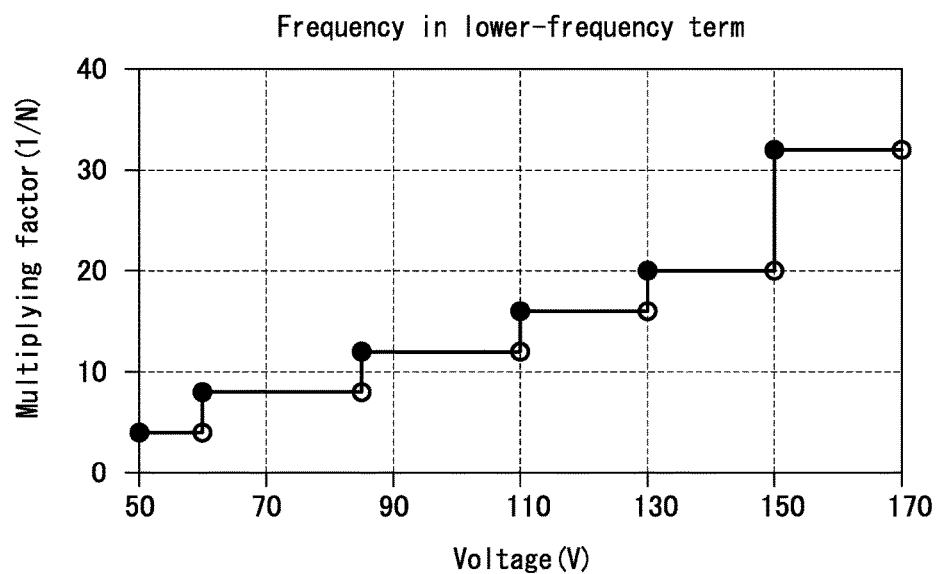
FIG. 9 is a view illustrating the relationship between the voltage (the electric current) and the multiplying factor for frequencies within lower-frequency terms, in the discharge lamp lighting device according to the same embodiment.

Next, with reference to FIGS. 5 and 9, the control of lower-frequency terms T20, which are repeated alternately with the basic terms T10, will be described.

As illustrated in FIG. 5, within each lower-frequency term T20, the control unit 3 controls the frequency of the AC electric current such that the frequency of the AC electric current becomes a frequency f20 which is lower than the lowest frequency within the previous basic term T10. More specifically, as illustrated in FIG. 9, the control unit 3 sets the frequency f20 within each lower-frequency term T20 to be the result of calculation on the lowest fixed frequency f1 within the fixation terms T1 in the previous basic term T10, in which the calculation is made with a multiplying factor based on the electric current within the previous basic term T10.

In the present embodiment, instead of the electric current within the previous basic term T10, it is also possible to employ the voltage within the previous basic term. T10, which correlates with this electric current. This is because the discharge lamp 10 is controlled with constant electric power. In FIG. 5, the voltage within each basic term T10a to T10c is set to be 85 V, and the frequency f20a, f20b in each lower-frequency term T20a, 20b is set to be a frequency which is 1/12 time the lowest fixed frequency f1 within the fixation terms T1 in the previous basic term T10a, T10b, as illustrated in FIG. 9.

With this structure, the frequency f20 within each lower-frequency term T20 is lower than the lowest frequency within the previous basic term T10. This enables evaporating, from the electrodes 12, even the metal returned to positions on the electrodes 12 from which the metal can not be evaporated within the variation terms T2 in the basic terms T10, namely the base end portions of the electrodes 12 (for example, the positions closer to the base ends than the position of P2 in FIG. 7).

The time periods of the lower-frequency terms T20 are preferably set such that the frequencies f20 provide at least one period. Further, the time periods of the lower-frequency terms T20 can be set such that the frequencies f20 provide a constant period. Also, the time periods of the lower-frequency terms T20 can be set to be either a constant time period or varying time periods.

The varied frequencies f2a to f2d are set to be frequencies provided by multiplying the fixed frequencies f1a to f1d by the inverse of a natural number. Further, the frequencies f20 within the lower-frequency terms T20 are set to be frequencies provided by multiplying the fixed frequencies f1a to f1d by the inverses of natural numbers.

On the other hand, the plural fixed frequencies f1a to f1d to be set within the fixation terms T1 are set to be respective frequencies provided by multiplying the highest frequency f1a out of these plural fixed frequencies f1a to f1d by the inverses of respective natural numbers. More specifically, the fixed frequencies f1a to f1d are 960 Hz, 480 Hz, 240 Hz and 120 Hz, respectively, which are 1/1 time, ½ time, ¼ time and ⅛ time the highest fixed frequency f1a, respectively.

This means that the varied frequencies f2a to f2d and the frequencies f20 in the lower-frequency terms T20 are set to be frequencies provided by multiplying the highest frequency f1a by the inverses of respective natural numbers. As described above, all the frequencies f1, f2 and f20 are set to be frequencies provided by multiplying the highest frequency f1a by the inverses of respective natural numbers, which makes it easier to synchronize signals of the projection-device main body 102 (for example, vertical synchronization signals) and signals of the light source device 101 (for example, polarity inversion signals), with each other.

Figure 10:
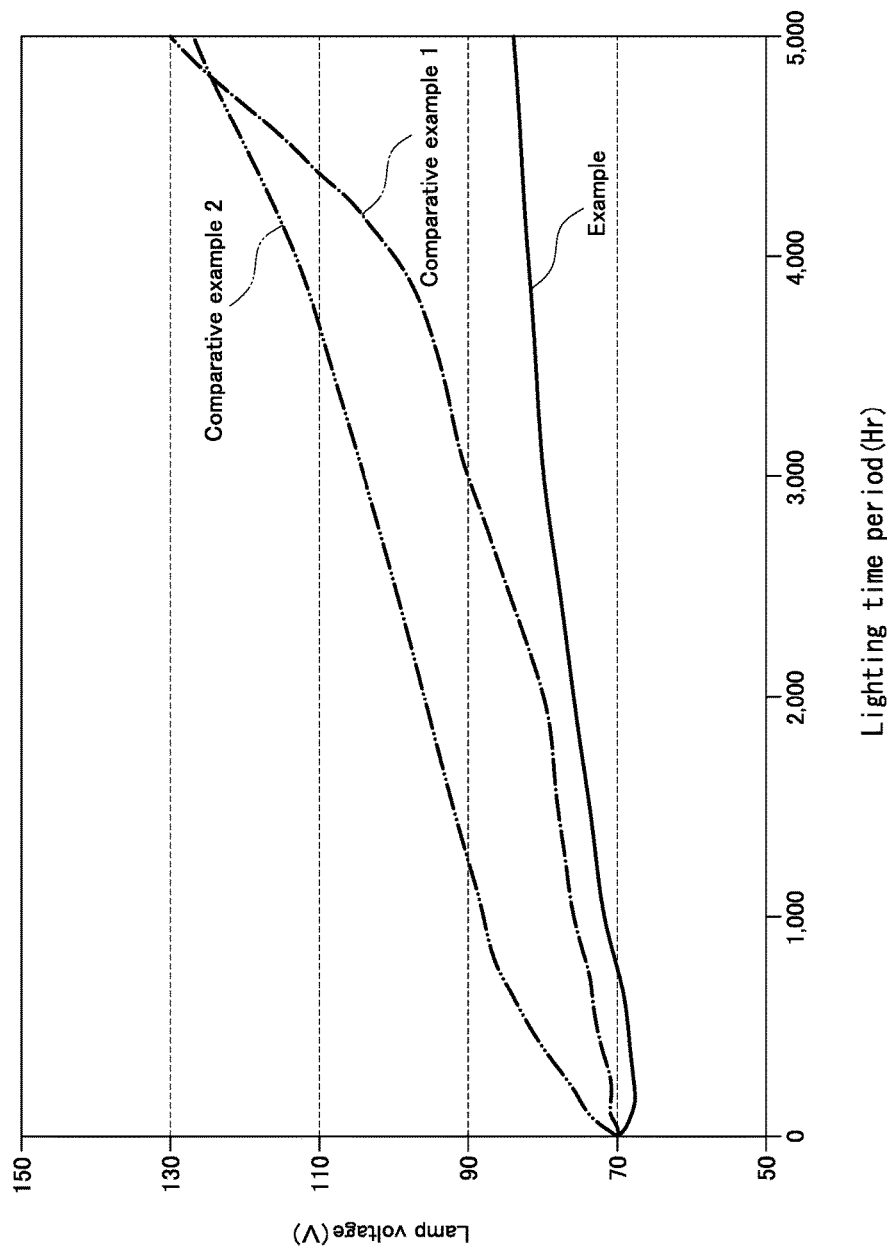
FIG. 10 shows a graph for illustrating an effect of the discharge lamp lighting device according to the same embodiment.

Next, effects of the discharge lamp lighting device 1 according to the present embodiment will be describe with reference to FIG. 10.

EXAMPLES

Examples and Comparative Examples 1 to 2

An example is the discharge lamp lighting device 1 according to the aforementioned embodiment illustrated in FIGS. 1 to 9.

A comparative example 1 is a discharge lamp lighting device adapted to control the frequency of the AC electric current, using fixation terms having a single fixed frequency, and lower-frequency terms.

A comparative example 2 is a discharge lamp lighting device adapted to control the frequency of the AC electric current, using fixation terms having plural fixed frequencies.
<Methods for Experiments>
Tests for lighting of the discharge lamp 10 were conducted, using the discharge lamp lighting devices according to the example and the respective comparative examples. As the lighting tests, a short-arc type discharge lamp with a rated electric power of 250 W was lighted for 5000 hours. While the lamp is lighted, the lamp voltage in the discharge lamp 10 was measured.
<Results of Experiments>
In the case of the discharge lamp 10 according to the comparative example 1, the lamp voltage was 70 V at the beginning of lighting. Further, the lamp voltage was 90 V when the lighting time period reached 3000 hours, and the lamp voltage was 130 V when the lighting time period reached 5000 hours.

In the case of the discharge lamp 10 according to the comparative example 2, the lamp voltage was 70 V at the beginning of lighting. Further, the lamp voltage already had exceeded 90 V when the lighting time period reached 3000 hours, and the lamp voltage was 127 V when the lighting time period reached 5000 hours.

On the contrary, in the case of the discharge lamp 10 according to the example, the lamp voltage was 70 V at the beginning of lighting. Further, the lamp voltage was 84 V even when the lighting time period reached 5000 hours.

As described above, in the respective comparative examples, as the lighting time period was increased, the electrodes 12 changed in shape and, therefore, the lamp voltage was made significantly larger. On the contrary, in the example, even when the lighting time period was made longer, the electrodes 12 were maintained in shape, which inhibited the lamp voltage from being made larger. Accordingly, in the example, it was possible to elongate the time period for which the electrodes 12 could be maintained in shape, thereby elongating the life of the discharge lamp 10.

As described above, with the discharge lamp lighting device 1 according to the present embodiment, the feeding unit 2 supplies the AC electric current to the discharge lamp 10 having the pair of electrodes 12 placed to oppose each other within the discharge container 11 which encloses predetermined gasses. The control unit 3 controls the frequency of the AC electric current supplied to the discharge lamp 10 from the feeding unit 2, in the different manners, within the fixation terms (the first terms) T1 and the variation terms (the second terms) T2 which are alternately repeated.

At first, within the fixation terms (the first terms) T1, the control unit 3 controls the frequency of the AC electric current such that the frequency of the AC electric current becomes one fixed frequency f1 out of the plural set fixed frequencies f1a to f1d. On the other hand, the positions on the electrodes 12 to which the metal evaporated from the electrodes 12 returns depend on the temperature of the electrodes 12. Further, the temperature of the electrodes 12 depends on the fixed frequencies f1 within the fixation terms (the first terms) T1 and the electric current within the fixation terms (the first terms) T1.

Therefore, within each of the variation terms (the second terms) T2, the control unit 3 controls the frequency of the AC electric current, based on the electric current and the fixed frequency f1 within the previous fixation term (the first term) T1, such that the frequency of the AC electric current becomes the varied frequency f2 which is lower than the fixed frequency f1. Consequently, the positions on the electrodes 12 to which the evaporated metal returns within the previous fixation terms (the first terms) T1 are accurately figured out.

Accordingly, within the variation terms (the second terms) T2, it is possible to supply the AC electric current with a frequency suitable thereto, to the discharge lamp 10. Therefore, even when the discharge lamp 10 is lighted for a longer time period, it is possible to maintain the shape of the electrodes 12 (particularly, the protruding portions 12c). This can elongate the time period for which the shape of the electrodes 12 can be maintained.

The discharge lamp lighting device of the present invention is not limited to the configuration of the embodiment described above, and the effects are not limited to those described above. It goes without saying that the discharge lamp lighting device of the present invention can be variously modified without departing from the scope of the subject matter of the present invention. For example, the constituents, methods, and the like of various modified examples described below may be arbitrarily selected and employed as the constituents, methods, and the like of the embodiments described above, as a matter of course.

In the discharge lamp lighting device 1 according to the aforementioned embodiment, the control unit 3 is structured to control the frequency of the AC electric current such that the frequency of the AC electric current becomes a predetermined single frequency out of the plural set frequencies f1a to f1d, within the fixation terms (the first terms) T1. However, the the discharge lamp lighting device 1 according to the present invention is not limited to this structure. For example, in the discharge lamp lighting device 1 according to the present invention, the control unit 3 can be also structured to control the frequency of the AC electric current such that the frequency of the AC electric current becomes predetermined two frequencies out of the plural set frequencies f1a to f1d, within the fixation terms (the first terms) T1, as illustrated in FIGS. 11 and 12.

Figure 11:
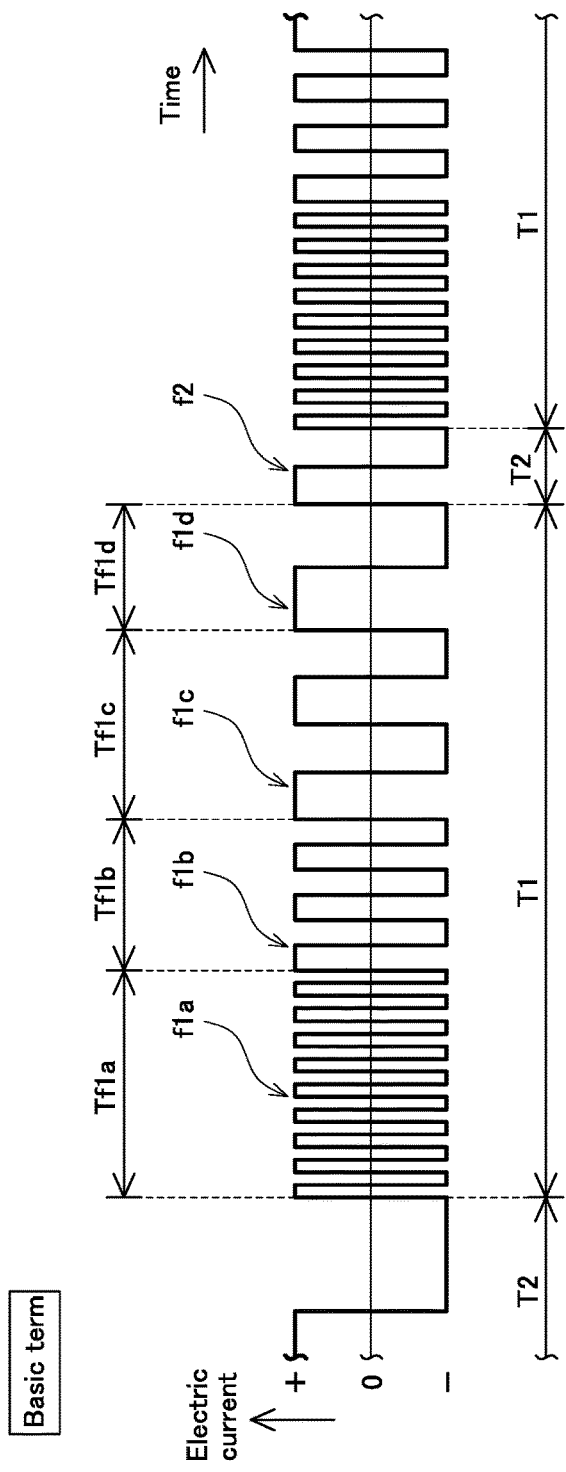
FIG. 11 is a view illustrating an electric current waveform in a discharge lamp lighting device according to another embodiment of the present invention.

According to the control method in FIG. 11, within each of the variation terms (the second terms) T2, the control unit 3 controls the frequency of the AC electric current, based on the fixed frequency f1a having a largest time ratio within the previous fixation term (the first term) T1 and based on the electric current within this fixation term T1, such that the frequency of the AC electric current becomes a varied frequency f2 which is lower than this frequency f1a. Referring to FIG. 11, the time period Tf1a of the first fixed frequency f1a is longer than the time periods Tf1b to Tf1d of the other fixed frequencies f1b to f1d. Further, the calculation of the varied frequency f2 can be also the same as the calculation according to the aforementioned embodiment (see FIG. 6).

With this control method, within the fixation terms T1, the metal returns in a larger amount to the positions on the electrodes 12 to which the metal returns at the first fixed frequency f1a. Accordingly, within the variation terms T2, it is possible to supply the AC electric current with a frequency suitable to these positions. Accordingly, even when the discharge lamp 10 is lighted for a longer time period, it is possible to maintain the shape of the electrodes 12 (particularly, the protruding portions 12c). This can elongate the time period for which the shape of the electrodes 12 can be maintained.

Figure 12:
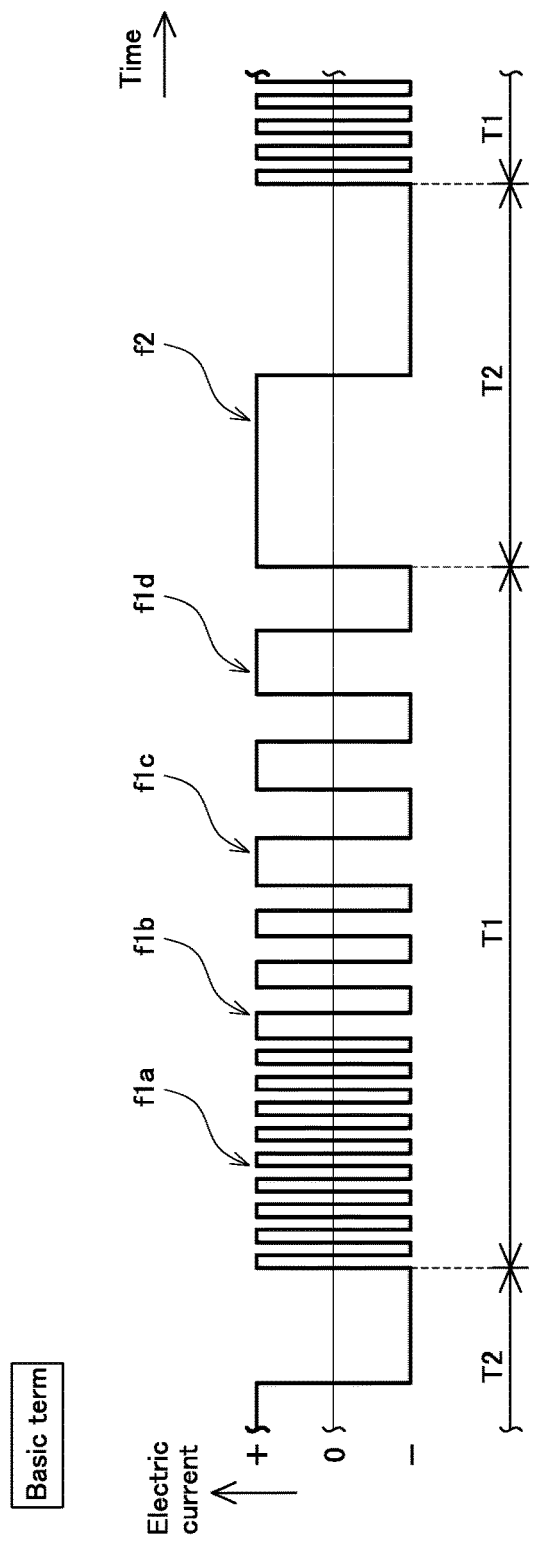
FIG. 12 is a view illustrating an electric current waveform in a discharge lamp lighting device according to yet another embodiment of the present invention.

Further, referring to FIG. 12, within each of the variation terms (the second terms) T2, the control unit 3 controls the frequency of the AC electric current, based on the lowest fixed frequency f1d within the previous fixation term (the first term) T1 and based on the electric current within this fixation term T1, such that the frequency of the AC electric current becomes a varied frequency f2 which is lower than this frequency f1d. Referring to FIG. 12, the frequency of the fourth fixed frequency f1d is longer than those of the other fixed frequencies f1a to f1c. Further, the calculation of the varied frequency f2 can be also the same as the calculation according to the aforementioned embodiment (see FIG. 6).

According to this control method, within the fixation terms T1, at the fourth fixed frequency f1d, the metal returns to positions on the electrodes 12 which are closest to the base ends (apart from the protruding portions 12c). Accordingly, within the variation terms T2, it is possible to supply the AC electric current with a frequency suitable to these positions. Accordingly, even when the discharge lamp 10 is lighted for a longer time period, it is possible to maintain the shape of the electrodes 12 (particularly, the protruding portions 12c). This can elongate the time period for which the shape of the electrodes 12 can be maintained.

Further, the discharge lamp lighting device 1 according to the aforementioned embodiment is structured such that the plural fixed frequencies f1a to f1d to be set within the fixation terms (the first terms) T1 are set to be respective frequencies provided by multiplying the highest frequency f1a out of these plural fixed frequencies f1a to f1d by the inverses of respective natural numbers. However, the discharge lamp lighting device 1 according to the present invention is not limited to this structure. Furthermore, the number of plural set fixed frequencies is not limited to four and can be also two, three, five or more.

Figure 13:
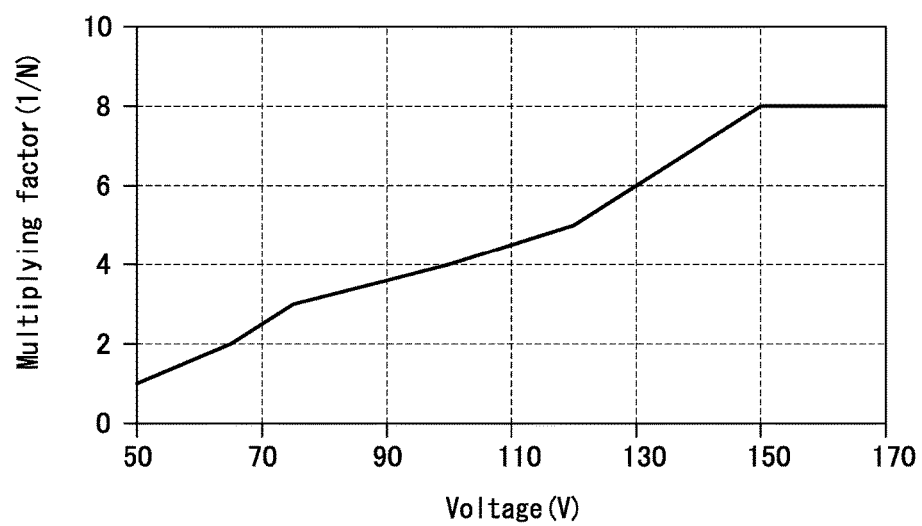
FIG. 13 is a view illustrating a relationship between a voltage and a multiplying factor for frequencies within variation terms, in a discharge lamp lighting device according to yet another embodiment of the present invention.

Further, the discharge lamp lighting device 1 according to the aforementioned embodiment is structured such that the varied frequencies f2 within the variation terms (the second terms) T2 are set to be frequencies provided by multiplying the highest frequency f1a out of the plural fixed frequencies f1a to f1d to be set within the fixation terms (the first terms) T1 by the inverses of natural numbers. However, the discharge lamp lighting device 1 according to the present invention is not limited to this structure. For example, in the discharge lamp lighting device 1 according to the present invention, as illustrated in FIG. 13, the control unit 3 can be also structured to set the varied frequency f2 within each of the variation terms (the second terms) T2 to be the result of calculation on the fixed frequency f1 within the previous fixation term T1 with a multiplying factor based on the electric current within the previous fixation term T1.

Figure 14:
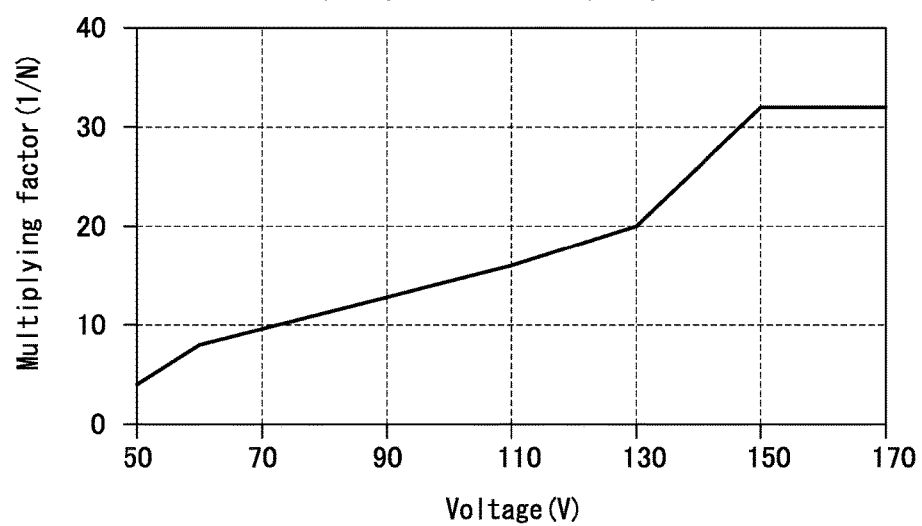
FIG. 14 is a view illustrating a relationship between a voltage and a multiplying factor for frequencies within lower-frequency terms, in a discharge lamp lighting device according to yet another embodiment of the present invention.

Further, the discharge lamp lighting device 1 according to the aforementioned embodiment is structured such that the frequencies f20 within the lower-frequency terms is set to be frequencies provided by multiplying the highest frequency f1a out of the plural fixed frequencies f1a to f1d to be set within the fixation terms (the first terms) T1 by the inverses of natural numbers. However, the discharge lamp lighting device according to the present invention is not limited to this structure. For example, in the discharge lamp lighting device 1 according to the present invention, as illustrated in FIG. 14, the control unit 3 can be also structured to set the frequency f20 within each of the lower-frequency terms T20 to be the result of calculation on the lowest fixed frequency f1 within the fixation terms T1 within the previous basic term T10 with a multiplying factor based on the electric current within the previous basic term T10.

Further, the discharge lamp lighting device 1 according to the aforementioned embodiment is structured to vary the fixed frequency f1 selected for each fixation term T1, based on data independent of data about operations of the discharge lamp 10, within the fixation terms T1. However, the discharge lamp lighting device according to the present invention is not limited to this structure. For example, the discharge lamp lighting device according to the present invention can be also structured to vary the fixed frequency f1 selected for each fixation term T1, based on data which depends of data about operations of the discharge lamp 10 (the voltage value, the electric current value, the luminance, the distance between the electrodes, the temperature and the like), within the fixation terms T1.

Further, the discharge lamp lighting device 1 according to the aforementioned embodiment is structured to alternately repeat the basic terms T10 and the lower-frequency terms T20. For example, the discharge lamp lighting device according to the present invention can be also structured to insert, through interruption, the lower-frequency terms T20 into the basic terms T10 or to insert, through overwriting, the lower-frequency terms T20 into the basic terms T10, through control programs.

Further, the discharge lamp lighting device 1 according to the aforementioned embodiment is structured to alternately repeat the fixation terms (the first terms) T1 and the variation terms (the second terms) T2. For example, the discharge lamp lighting device according to the present invention can be also structured to insert, through interruption, the variation terms (the second terms) T2 into the fixation terms (the first terms) T1 or to insert, through overwriting, the variation terms (the second terms) T2 into the fixation terms (the first terms) T1, through control programs.

DESCRIPTION OF REFERENCE SIGNS

1 Discharge lamp lighting device
2 Feeding unit
3 Control unit
10 Discharge lamp
11 Discharge container
12 Electrode
12a Head portion
12b Shaft portion
12c Protruding portion
13 Sealing portion
14 Metal foil
15 Outer lead
21 Step-down chopper unit
22 DC/AC conversion unit
22a Driver
23 Starter unit
31 Electric power control unit
32 Pulse generating unit
33 Frequency control unit
100 Image projection device
101 Light source device
102 Projection-device main body
103 Optical fiber
104 Screen
T1 First term (fixation term)
T2 Second term (variation term)
T10 Basic term
T20 Lower-frequency term

The invention claimed is:

1. A discharge lamp lighting device comprising:
a feeding unit adapted to supply an AC electric current to a discharge lamp having a pair of electrodes placed to oppose each other within a discharge container which encloses a predetermined gas; and
a control unit adapted to control a frequency of the AC electric current supplied to the discharge lamp by the feeding unit, in different manners within a first term and a second term which are alternately repeated;
wherein
the control unit is adapted to control the frequency of the AC electric current, independent of a current value of the discharge lamp, such that, within the first term, the frequency of the AC electric current becomes at least one fixed frequency out of plural set fixed frequencies,
the control unit is adapted to control the frequency of the AC electric current to a varied frequency varied based on the at least one fixed frequency and an electric current value within the previous first term, such that, within the second term directly after the first term, the frequency of the AC electric current becomes the varied frequency lower than the at least one fixed frequency,
wherein the control unit is adapted to control the frequency of the AC electric current in such a way as to alternately repeat a basic term and a lower-frequency term, the basic term being provided for controlling the frequency of the AC electric current in different manners within the first term and the second term which are alternately repeated, and the lower-frequency term being provided for controlling the frequency of the AC electric current such that the frequency of the AC electric current becomes a frequency lower than a lowest frequency within the previous basic term,
the control unit is adapted to control the frequency of the AC electric current, independent of a current value of the discharge lamp, such that, within another first term different from the first term, the frequency of the AC electric current becomes at least one another fixed frequency, different from the at least one fixed frequency, out of the plural set fixed frequencies, and
the control unit is adapted to control the frequency of the AC electric current such that during another second term directly after the another first term, the frequency of the AC electric current becomes another varied frequency that is based on the at least one another fixed frequency and an electric current value within the another first term, and lower than the at least one another fixed frequency.

2. The discharge lamp lighting device according to claim 1, wherein the control unit is adapted to control the frequency of the AC electric current such that the frequency of the AC electric current becomes one fixed frequency out of plural set frequencies, within the first term.

3. The discharge lamp lighting device according to claim 1, wherein the control unit is adapted to control the frequency of the AC electric current such that, within the first term, the frequency of the AC electric current becomes at least two fixed frequencies out of the plural set fixed frequencies, and is further adapted to control the frequency of the AC electric current, based on an electric current and a fixed frequency having a largest time ratio within the previous first term, such that, within the second term, the frequency of the AC electric current becomes the varied frequency lower than the fixed frequency having a largest time ratio within the previous first term.

4. The discharge lamp lighting device according to claim 1, wherein the control unit is adapted to control the frequency of the AC electric current such that, within the first term, the frequency of the AC electric current becomes at least two fixed frequencies out of the plural set fixed frequencies, and is further adapted to control the frequency of the AC electric current, based on an electric current and a lowest fixed frequency within the previous first term, such that, within the second term, the frequency of the AC electric current becomes the varied frequency lower than the lowest fixed frequency within the previous first term.

5. The discharge lamp lighting device according to claim 1, wherein
the plural fixed frequencies to be set within the first term are set to be respective frequencies provided by multiplying a highest frequency out of the plural fixed frequencies by the inverses of respective natural numbers greater than zero, and
the varied frequency within the second term is set to be a frequency provided by multiplying the highest frequency by the inverse of a natural number greater than zero.

6. The discharge lamp lighting device according to claim 1, wherein the control unit is adapted to control the frequency of the AC electric current, based on an electric current and a predetermined frequency within the previous basic term, such that the frequency of the AC electric current becomes a frequency lower than the predetermined frequency, within the lower-frequency term.

7. The discharge lamp lighting device according to claim 1, wherein the plural fixed frequencies to be set within the first term are set to be frequencies provided by multiplying a highest frequency out of the plural fixed frequencies by the inverses of respective natural numbers greater than zero, the varied frequency within the second term is set to be a frequency provided by multiplying the highest frequency by the inverse of a natural number greater than zero, and the frequency within the lower-frequency term is set to be a frequency provided by multiplying the highest frequency by the inverse of a natural number greater than zero.

8. A discharge lamp lighting device comprising: a feeding unit adapted to supply an AC electric current to a discharge lamp having a pair of electrodes placed to oppose each other within a discharge container which encloses a predetermined gas; and
a control unit adapted to control a frequency of the AC electric current supplied to the discharge lamp by the feeding unit, in different manners within a first term and a second term which are alternately repeated;
wherein the control unit is adapted to control the frequency of the AC electric current in such a way as to alternately repeat a basic term and a lower-frequency term, the basic term being provided for controlling the frequency of the AC electric current in different manners within the first term and the second term which are alternately repeated, and the lower-frequency term being provided for controlling the frequency of the AC electric current such that the frequency of the AC electric current becomes a frequency lower than a lowest frequency within the previous basic term, and
wherein the control unit is adapted to control the frequency of the AC electric current, independent of a current value of the discharge lamp, such that, within at least one the first term, the frequency of the AC electric current becomes at least two fixed frequency out of plural set fixed frequencies, and the control unit is adapted to control the frequency of the AC electric current to a varied frequency varied based on the at least one fixed frequency and an electric current value within the previous first term, such that, within the second term directly after the first term, the frequency of the AC electric current becomes the varied frequency lower than the at least one fixed frequency.

9. The discharge lamp lighting device according to claim 8, wherein the control unit is adapted to control the frequency of the AC electric current, based on an electric current and a fixed frequency having a largest time ratio within the previous first term, such that, within the second term, the frequency of the AC electric current becomes the varied frequency lower than the fixed frequency having a largest time ratio within the previous first term.

10. The discharge lamp lighting device according to claim 8, wherein the control unit is adapted to control the frequency of the AC electric current, based on an electric current and a lowest fixed frequency within the previous first term, such that, within the second term, the frequency of the AC electric current becomes the varied frequency lower than the lowest fixed frequency within the previous first term.

11. The discharge lamp lighting device according to claim 8, wherein
the plural fixed frequencies to be set within the first term are set to be respective frequencies provided by multiplying a highest frequency out of the plural fixed frequencies by the inverses of respective natural numbers greater than zero, and
the varied frequency within the second term is set to be a frequency provided by multiplying the highest frequency by the inverse of a natural number greater than zero.

12. The discharge lamp lighting device according to claim 8, wherein the control unit is adapted to control the frequency of the AC electric current, based on an electric current and a predetermined frequency within the previous basic term, such that the frequency of the AC electric current becomes a frequency lower than the predetermined frequency, within the lower-frequency term.

13. The discharge lamp lighting device according to claim 8, wherein the plural fixed frequencies to be set within the first term are set to be frequencies provided by multiplying a highest frequency out of the plural fixed frequencies by the inverses of respective natural numbers greater than zero, the varied frequency within the second term is set to be a frequency provided by multiplying the highest frequency by the inverse of a natural number greater than zero, and the frequency within the lower-frequency term is set to be a frequency provided by multiplying the highest frequency by the inverse of a natural number greater than zero.

14. A discharge lamp lighting device comprising:
a feeding unit adapted to supply an AC electric current to a discharge lamp having a pair of electrodes placed to oppose each other within a discharge container which encloses a predetermined gas; and
a control unit adapted to control a frequency of the AC electric current supplied to the discharge lamp;

wherein
the control unit is adapted to control the frequency of the AC electric current in such a way as to alternately repeat a basic term and a lower-frequency term, the basic term being provided for controlling the frequency of the AC electric current in different manners within the first term and the second term which are alternately repeated, and the lower-frequency term being provided for controlling the frequency of the AC electric current such that the frequency of the AC electric current becomes a frequency lower than a lowest frequency within the previous basic term, the control unit is adapted to control the frequency of the AC electric current, independent of a current value of the discharge lamp, such that, within the first term, the frequency of the AC electric current becomes at least one fixed frequency out of plural set fixed frequencies, the control unit is adapted to control the frequency of the AC electric current to a varied frequency varied based on the at least one fixed frequency and an electric current value within the previous first term, such that, within the second term directly after the first term, the frequency of the AC electric current becomes the varied frequency lower than the at least one fixed frequency, and the control unit is adapted to control the frequency of the AC electric current, within at least one the basic term, the frequency of the AC electric current becomes at least two fixed frequencies and at least two varied frequencies.

* * * * *